United States Patent
Nammi

(10) Patent No.: US 9,484,997 B2
(45) Date of Patent: Nov. 1, 2016

(54) DETERMINING A PRECODER OF A CODEBOOK

(71) Applicant: Telefonaktiebolaget L M Ericsson (publ), Stockholm (SE)

(72) Inventor: Sairamesh Nammi, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/441,720

(22) PCT Filed: Nov. 21, 2012

(86) PCT No.: PCT/SE2012/051284
§ 371 (c)(1),
(2) Date: May 8, 2015

(87) PCT Pub. No.: WO2014/081357
PCT Pub. Date: May 30, 2014

(65) Prior Publication Data
US 2015/0288435 A1     Oct. 8, 2015

(51) Int. Cl.
*H04L 7/04*     (2006.01)
*H04B 7/04*     (2006.01)
*H04L 25/03*    (2006.01)
*H04L 5/00*     (2006.01)

(52) U.S. Cl.
CPC .......... *H04B 7/0486* (2013.01); *H04B 7/0417* (2013.01); *H04L 5/0048* (2013.01); *H04L 25/03343* (2013.01); *H04L 25/03891* (2013.01)

(58) Field of Classification Search
CPC .............. H04B 7/0417; H04B 7/0486; H04L 25/03343

USPC ......................... 375/219, 260, 267, 295, 316
See application file for complete search history.

(56) References Cited

U.S. PATENT DOCUMENTS

2011/0019613 A1    1/2011    Han et al.
2011/0032839 A1    2/2011    Chen et al.
(Continued)

FOREIGN PATENT DOCUMENTS

EP         2 381 588 A2     10/2011
WO    WO 2009/120048 A2    10/2009
(Continued)

OTHER PUBLICATIONS

International Search Report, PCT Application No. PCT/SE2012/015284, Nov. 18, 2013.
(Continued)

*Primary Examiner* — Freshteh N Aghdam
(74) *Attorney, Agent, or Firm* — Myers Bigel, P.A.

(57) ABSTRACT

A Network Node, a UE operable in a MIMO system and respective methods performed by the Network Node and UE are provided for determining a precoder of a Codebook to use for transmissions to the UE. The Network Node includes at least two transmitting antennas corresponding to two individual Ranks. The Network Node determines which precoders the UE shall evaluate, and transmits, to the UE, the determined precoders the UE shall evaluate. The Network Node receives, from the UE, a PMI, associated with one of the determined precoders, which the UE requests the Network Node to use for transmission to the UE; and the Network Node transmits, to the UE, data using the requested precoders.

16 Claims, 14 Drawing Sheets

(56) References Cited

U.S. PATENT DOCUMENTS

| | | | |
|---|---|---|---|
| 2011/0034192 A1* | 2/2011 | Lim | H04B 7/0417 455/501 |
| 2011/0081901 A1 | 4/2011 | Moulsley et al. | |
| 2011/0200131 A1 | 8/2011 | Gao et al. | |
| 2012/0082248 A1 | 4/2012 | Han et al. | |
| 2013/0301560 A1* | 11/2013 | Geirhofer | H04B 7/0621 370/329 |
| 2015/0085954 A1* | 3/2015 | Han | H04B 7/0413 375/295 |

FOREIGN PATENT DOCUMENTS

| | | |
|---|---|---|
| WO | WO 2011/021861 A2 | 2/2011 |
| WO | WO 2011/091440 A1 | 7/2011 |

OTHER PUBLICATIONS

Written Opinion of the International Searching Authority, PCT Application No. PCT/SE2012/015284, Nov. 18, 2013.

3GPP, LTA Paper, "UTRA-UTRAN Long Term Evolution (LTE) and 3GPP System Architecture Evolution (SAE)", retrieved Apr. 3, 2015 from ftp://ftp.3gpp.org/Inbox/2008_web_files/LTA_Paper.pdf, 8 pp.

3GPP, Technical Specification, "3rd Generation Partnership Project; Technical Specification Group Radio Access Network; Evolved Universal Terrestrial Radio Access (E-UTRA); Physical layer procedures (Release 8)", 3GPP TS 36.213 V8.5.0 (Dec. 2008), 74 pp.

Love et al., "Quantized Antenna Weighting Codebook Design for Multiple-Input Multiple-Output Wireless Systems", *Proceedings of the $40^{th}$ Allerton Conference on Communication, Control and Computing*, Moticello, IL, Oct. 2002, 2 pp.

Mukkavilli et al., "Design of Multiple Antenna Coding Schemes with Channel Feedback", *Conference Record of the $35^{th}$ Asilomar Conference on Signals, Systems and Computers*, Pacific Grove, CA, Nov. 4-7, 2001, pp. 1009-1013.

Sampath et al., "Generalized Linear Precoder and Decoder Design for MIMO Channels Using the Weighted MMSE Criterion", *IEEE Transactions on Communications*, vol. 49, No. 12, Dec. 2001, pp. 2198-2206.

Scaglione et al., "Optimal Designs for Space-Time Linear Precoders and Decoders", *IEEE Transactions on Signal Processing*, vol. 50, No. 5, May 2002, pp. 1051-1064.

Teletar, "Capacity of Multi-antenna Gaussian Channels", *European Transactions on Telecommunications*, vol. 10, Nov. 1999, pp. 585-595.

Extended European Search Report Corresponding to European Application No. 12888752.8; Dated: Jun. 10, 2016; 9 Pages.

\* cited by examiner

| | | Number of bits Ac | |
|---|---|---|---|
| | | 2 antenna ports | 4 antenna ports |
| Transmission mode | Open-loop spatial multiplexing | 2 | 4 |
| | Closed-loop spatial multiplexing | 6 | 64 |
| | Multi-user MIMO | 4 | 16 |
| | Closed-loop rank=1 precoding | 4 | 16 |

Fig. 14

DETERMINING A PRECODER OF A CODEBOOK

CROSS REFERENCE TO RELATED APPLICATION

This application is a 35 U.S.C. §371 national stage application of PCT International Application No. PCT/SE2012/051284, filed on 21 Nov. 2012, the disclosure and content of which is incorporated by reference herein in its entirety. The above-reference PCT International Application was published in the English language as International Publication No. WO 2014/081357 A1 on 30 May 2014.

TECHNICAL FIELD

The present embodiments of the present invention relate to determining a precoder of a codebook in a Multiple Input Multiple Output, MIMO, radio communication system and in particular to a network node and a UE for determining the precoder of the codebook in the MIMO radio communication system.

BACKGROUND

Multiple antennas employed at the transmitter and receiver can significantly increase the system capacity. By transmitting independent symbol streams in the same frequency bandwidth, usually termed as Spatial Multiplexing, SM, a linear increase in data rates with the increased number of antennas is achieved. On the other hand, by using space-time codes at the transmitter, reliability of the detected symbols can be improved by exploiting the so-called transmit diversity. Both these schemes assume no channel knowledge at the transmitter. However, in a practical wireless systems such as the 3rd Generation Partnership Project, 3GPP, Long Term Evolution, LTE, High Speed Downlink Packet Access, HSDPA, and Worldwide Interoperability for Microwave Access, WiMAX systems, the channel knowledge can be made available at the transmitter via feedback from the receiver to the transmitter. The MIMO transmitter may utilize this channel information to improve the system performance with the aid of precoding. In addition to beam forming gain, the use of precoding avoids the problem of ill-conditioned channel matrix.

In practice, complete Channel State Information, CSI, may be available for a communication system using the Time Division Duplex, TDD, scheme by exploiting channel reciprocity. However, for a Frequency Division Duplex, FDD, system, complete CSI is more difficult to obtain. In a FDD system, some kind of CSI knowledge may be available at the transmitter via feedback from the receiver. These systems are called limited feedback systems. There are many implementations of limited feedback systems such as e.g. codebook based feedback and quantized channel feedback. 3GPP LTE, HSDPA and WiMAX recommend codebook based feedback CSI for precoding.

In a codebook based precoding, a predefined codebook is defined both at the transmitter and at the receiver. The entries of codebook may be constructed using different methods. For example Grassmannian, Lloyd algorithm, Discrete Fourier Transform, DFT, matrix etc. The precoder matrix may be chosen to match the characteristics of the $N_R \times N_T$ MIMO channel matrix H, resulting in so-called channel dependent precoding. Here, $N_R$ represents the number of receive antennas and $N_T$ represents the number of transmit antennas, This is also commonly referred to as closed-loop precoding and essentially strives to focus the transmit energy into a subspace which is strong in the sense of conveying much of the transmitted energy to the UE.

In addition, the precoder matrix may also be selected to strive for orthogonalising the channel, meaning that after proper linear equalisation at the UE, the inter-layer interference is reduced. At the receiver it is common to find the Signal Interference Noise Ratio, SINR, with different codebook entries and choose the Rank/precoding index which gives highest spectral efficiency (capacity).

The performance of closed loop MIMO system generally improves with the cardinality (size) of the codebook set. At the receiver, Rank information and precoding index has to be sent back to the transmitter every TTI or multiples of TTI. In general, finding the Rank information and precoding index is cumbersome and involves many computations. Note that for a 4×4 MIMO system, the 3GPP standard specifies a codebook of 64 elements (16 codewords per each Rank)

SUMMARY

The object is to obviate at least some of the problems outlined above. In particular, it is an object to provide a Network node operable in a MIMO radio communication system and a method performed by the Network Node for determining a precoder of a Codebook to use for transmissions to a UE. It is further an object to provide a UE operable in a MIMO radio communication system and a method performed by the UE for determining a PMI to report to a Network Node. These objects and others may be obtained by providing a Network Node and a UE and a respective method performed by the Network Node and the UE according to the independent claims attached below.

According to an aspect a method performed by a Network Node operable in a MIMO radio communication system is provided. The Network Node comprises at least two transmitting antennas corresponding to two individual Ranks. The method comprises determining, for individual Ranks, which precoders out of 16 predefined precoders that the UE shall evaluate, wherein the number of precoders to evaluate is less than 16; and transmitting, to the UE, the determined precoders the UE shall evaluate for the individual Ranks. The method further comprises receiving, from the UE, a Precoding Matrix Indicator, PMI, associated with one of the determined precoders, which the UE requests the Network Node to use for transmission to the UE for the individual Ranks; and transmitting, to the UE, data using the requested precoders for the individual Ranks.

According to an aspect a method performed by a UE operable in a MIMO radio communication system for determining a PMI to report to a Network Node is provided. The UE comprises at least two receiving antennas corresponding to two Ranks. The method comprises receiving, from the Network Node, information regarding, for individual Ranks, which precoders out of 16 predefined precoders the UE shall evaluate, wherein the number of precoders to evaluate are less than 16. The method further comprises determining, for each of the precoders to be evaluated, a channel quality of a pilot signal received from the Network Node; and determining for which precoder an acceptable quality of the received pilot signal is achieved/provided. The method further comprises transmitting, to the Network Node, a PMI indicating the determined precoder.

According to an aspect, a Network Node operable in a MIMO radio communication system adapted for determining a precoder of a Codebook to use for transmissions to a UE is provided. The Network Node comprises at least two transmitting antennas corresponding to two individual Ranks. The Network Node comprises a determining unit adapted to determine, for individual Ranks, which precoders out of 16 predefined precoders that the UE shall evaluate, wherein the number of precoders to evaluate are less than 16. The Network Node further comprises a transmitting unit adapted to transmit, to the UE, the determined precoders the UE shall evaluate for the individual Ranks. The Network Node also comprises a receiving unit adapted to receive, from the UE, a PMI associated with one of the determined precoders, which the UE requests the Network Node to use for transmission to the UE for the individual Ranks. The transmitting unit is further adapted to transmit, to the UE, data using the requested precoders for the individual Ranks.

According to an aspect, a UE operable in a MIMO radio communication system adapted for determining a PMI to report to a Network Node is provided. The UE comprises at least two receiving antennas corresponding to two Ranks. The UE comprises a receiving unit, adapted to receive, from the Network Node, information regarding, for individual Ranks, which precoders out of 16 predefined precoders the UE shall evaluate, wherein the number of precoders to evaluate are less than 16. The UE further comprises a determining unit, adapted to determine, for each of the precoders to be evaluated, a channel quality of a pilot signal received from the Network Node; and to determine for which precoder an acceptable quality of the received pilot signal is achieved/provided. The UE also comprises a transmitting unit, adapted to transmit, to the Network Node, a PMI indicating the determined precoder.

The Network Node, the UE and the respective method performed by the Network Node and the UE may have several advantages. The UE may not need to evaluate and analyse 16 different precoders for each individual Rank, but instead a few number of precoders need to be evaluated by the UE. Hence, the UE may save power consumption due to less processing needed which may result in battery life improvement. Further, the percentage degradation with respect to a full evaluation of all 16 precoders for each individual Rank is minimal and the complexity, at the UE, may be reduced up to 8 times.

BRIEF DESCRIPTION OF DRAWINGS

Embodiments will now be described in more detail in relation to the accompanying drawings, in which:

FIG. 14 is a table of number of bits in codebook subset restriction bitmap for applicable transmission modes.

DETAILED DESCRIPTION

Briefly described, a Network Node, a UE and respective methods therein are provided for determining a precoder of a codebook to use for transmissions to the UE. The Network Node and the UE are operable in a MIMO radio communication system and the Network Node comprises at least two transmitting antennas corresponding to two individual Ranks. The Network Node and the UE make use of a reduced codebook for determining the precoder to be used for transmissions to the UE.

Figure 1:
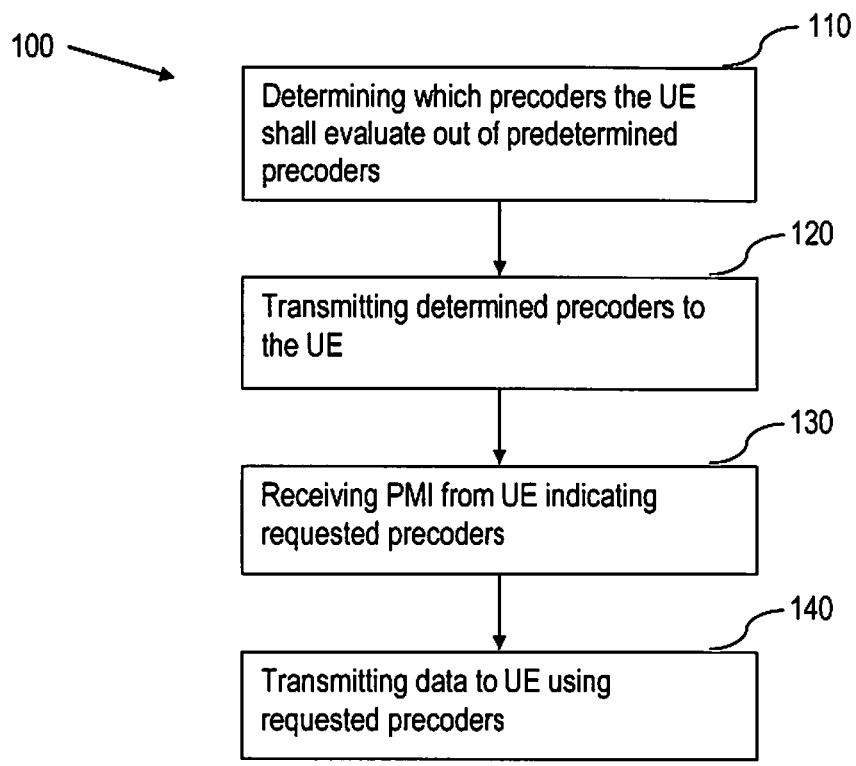
FIG. 1 is a flowchart of a method in a Network Node operable in a MIMO radio communication system for determining a precoder of a codebook to use for transmissions to a UE according to an exemplifying embodiment.

Such a method will now be described with reference to FIG. 1. FIG. 1 is a flowchart of a method in a Network Node operable in a MIMO radio communication system for determining a precoder of a codebook to use for transmissions to a UE according to an exemplifying embodiment. The Network Node comprises at least two transmitting antennas corresponding to two individual Ranks. FIG. 1 illustrates the method comprising determining 110, for individual Ranks, which precoders out of 16 predefined precoders that the UE shall evaluate, wherein the number of precoders to evaluate is less than 16; and transmitting 120, to the UE, the determined precoders the UE shall evaluate for the individual Ranks. The method further comprises receiving 130, from the UE, a Precoding Matrix Indicator, PMI, associated with one of the determined precoders, which the UE requests the Network Node to use for transmission to the UE for the individual Ranks; and transmitting 140, to the UE, data using the requested precoders for the individual Ranks.

Before the Network Node starts transmitting any data to the UE, the Network Node should first determine, for each individual Rank, which precoder the Network Node should use when transmitting data to the UE. The Network Node transmits pilot signals which are measured by the UE. The measurements are then reported to the Network Node so that the Network Node is provided with information relating to the radio channel between the Network Node and the UE. The Network Node determines 110 which precoders out of 16 predefined precoders that the UE shall evaluate for each individual Rank. In this example there are 16 predefined available precoders per Rank. The Network Node determines which ones out of these 16 precoders that the UE shall evaluate. It shall be pointed out that the number of precoders and which precoders out of the 16 predefined precoders that the UE shall evaluate for each individual Rank are individual for each individual Rank.

Then the Network Node transmits 120 the determined precoders the UE shall evaluate for the individual Ranks to the UE. The UE will then perform measurements on e.g. the pilot signals and evaluate the different precoders that the Network Node has indicated to the UE that the UE shall evaluate. By transmitting 120 the determined precoders the UE is meant that the Network Node transmits indices which "point to", or are associated with, precoders in the codebook. The codebook can be seen as a matrix comprising all the different precoders and each individual precoder in the codebook can be identified by an index. This means that the Network Node has stored, in a memory within the Network Node, the codebook; and the UE has also stored, in a memory within the UE, the codebook. The UE should have a full codebook stored in its memory whereas the Network Node may only have stored in its memory a reduced codebook. The reduced codebook comprises less precoders than the full codebook, which comprises all possible, or available, precoders.

Once the UE has evaluated the indicated precoders, the UE transmits a PMI back to the Network Node. The PMI is associated with one of the determined precoders and it points out which precoder is preferred by the UE. The UE will transmit one PMI per Rank, or the PMI indicates individual precoders associated with respective individual Ranks. The Network Node receives 130 the PMI(s) from the UE and is in this manner informed about, for each individual Rank, which precoder the Network Node shall use when transmitting data to the UE. The Network Node then transmits 140 data to the UE using the requested precoders for the individual Ranks.

The method performed by the Network Node has several advantages. The UE will not need to evaluate and analyse 16 different precoders for each individual Rank, but instead a few number of precoders need to be evaluated by the UE. Hence, the UE may save power consumption due to less processing needed which may result in battery life improvement. Further, the percentage degradation with respect to a full evaluation of all 16 precoders for each individual Rank is minimal and the complexity, at the UE, may be reduced up to 8 times.

According to an embodiment, at least one Rank is associated with a different number of precoders compared to the other Ranks.

For example, in case the Network Node comprises two transmitting antennas corresponding to two individual Ranks, the first Rank is associated with e.g. 4 different precoders and the second Rank is associated with e.g. 6 different precoders. Yet another example is that the Network Node comprises two transmitting antennas corresponding to two individual Ranks. Then the first Rank is associated with e.g. 4 different precoders, the second Rank is associated with e.g. 2 different precoders and the third Rank is associated with 2, 4 or 6 different precoders.

When the Network Node determines 110 which precoders out of 16 predefined precoders that the UE shall evaluate for each individual Rank, the Network Node determines, for at least one Rank, a different number of precoders compared to the other Ranks.

In an example, at least one of the Ranks is associated with an unequal number of precoders.

According to still an embodiment, transmitting 120 the determined precoders to the UE to evaluate for the individual Ranks comprises transmitting a bitmap wherein each position in the bitmap correspond to a precoder in the Codebook.

As described above, each individual precoder in the codebook may be represented by an index. When the Network Node determines 110 which precoders out of 16 predefined precoders that the UE shall evaluate for each individual Rank, the Network Node uses the respective indices to identify the determined precoders. When the Network Node than transmits 120 the determined precoders for the UE to evaluate for the individual Ranks, the Network Node forms a bitmap comprising the indices which represents the determined precoders to be evaluated by the UE. The Network Node then transmits the bitmap to the UE.

The bitmap may form a sequence of bits, where each bit corresponds to an index. One example of such a bitmap has the bit sequence $\alpha_{A_c-1}, \ldots, \alpha_2, \alpha_2, \alpha_1, \alpha_0$, where, $\alpha_0$ is the Least Significant Bit, LSB, and 60 $_{A_c-1}$ is the Most Significant Bit, MSB. In the bitmap, a bit value of 0 (zero) indicates that the corresponding precoder shall not be evaluated by the UE, and the value of 1 (one) indicates that the corresponding precoder shall be evaluated by the UE. This means that the bitmap has an entry for each possible precoder in the codebook, i.e. a full codebook, wherein the determined precoders out of 16 predefined precoders that the UE shall evaluate for each individual Rank are indicated in the bitmap by the value 1 and all the not determined precoders are represented by the value 0. The UE will receive the bitmap and from the sequence of ones and zeros, the UE is given the indices associated with the determined precoders out of 16 predefined precoders that the UE shall evaluate for each individual Rank. Each position in the bitmap is thus associated with a specific index of the codebook. An exemplifying association of bits to precoders for the relevant transmission modes are given in the table of FIG. 14.

According to yet an embodiment, the MIMO radio communication system is based on Long Term Evolution, LTE, High Speed Packet Access, HSPA or WiMax.

There are different examples of the MIMO radio communication systems. Here are three examples which all three employs a codebook of 16 predefined precoders for each individual Rank.

In 3$^{rd}$ Generation Partnership Project, 3GPP, LTE standard, separate codebooks are defined for various combinations of the number of transmit antennas and the number of transmission layers, i.e. rank information, RI. For example, for 4 transmit antennas total 64 precoding vectors and matrices are defined. Also for each rank in the codebook for the scenarios of RI=1, 2, 3 and 4, 16 elements/precoders per rank are defined.

Embodiments herein also relate to a method performed by a UE operable in a MIMO radio communication system for determining a PMI to report to a Network Node, the UE comprising at least two receiving antennas corresponding to two Ranks. Such a method will now be described with reference to FIG. 2, which is a flowchart of an example of the method performed by the UE.

Figure 2:
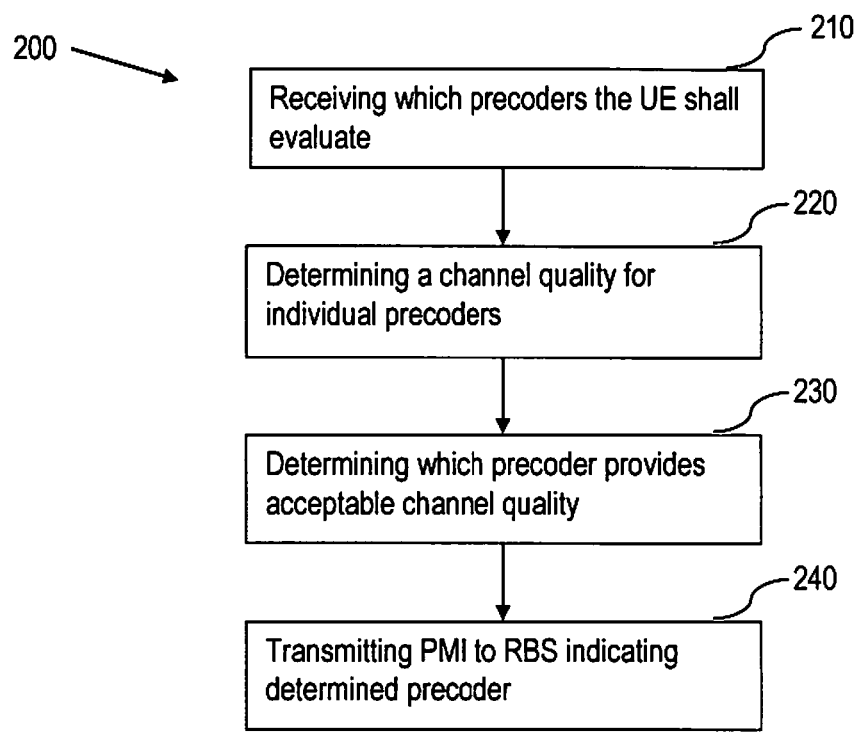
FIG. 2 is a flowchart of a method in a UE operable in a MIMO radio communication system for determining a PMI to report to a Network Node according to an exemplifying embodiment.

FIG. 2 illustrates the method 200 comprising receiving 210, from the Network Node, information regarding, for individual Ranks, which precoders out of 16 predefined precoders the UE shall evaluate, wherein the number of precoders to evaluate are less than 16. The method further comprises determining 220, for each of the precoders to be evaluated, a channel quality of a pilot signal received from the Network Node; and determining 230 for which precoder an acceptable quality of the received pilot signal is achieved/ provided. The method further comprises transmitting 240, to the Network Node, a PMI indicating the determined precoder.

The UE being served by the Network Node may perform different measurements on different signals received from the Network Node. One example of signals on which the UE performs measurements is pilot signals. The measurements are performed in order to obtain knowledge about e.g. a radio channel between the Network Node and the UE. Reports of the measurements are then sent to the Network Node, which may then use the information in order to improve or optimise transmissions from the Network Node to the UE over the radio channel.

The Network Node also transmits, to the UE, information regarding, for individual Ranks, which precoders out of predefined precoders the UE shall evaluate. The evaluation of the precoders will enable the Network Node to use a precoder or precoders in order to improve or optimise transmissions from the Network Node to the UE over the radio channel. The UE will thus receive 210, from the Network Node, information regarding, for individual Ranks, which precoders out of 16 predefined precoders the UE shall evaluate for each Rank, wherein the number of precoders to evaluate are less than 16. This means that instead of the UE having to evaluate each and every precoder out of the 16 predefined precoders, the UE is requested on evaluate a smaller amount of precoders.

The UE then determines 220, for each of the precoders to be evaluated, a channel quality of a pilot signal received from the Network Node; and determining 230 for which precoder an acceptable quality of the received pilot signal is achieved/provided. In other words, the UE receives the pilot signal and for each of the precoders to be evaluated, per individual Rank, the UE performs analysis and processing of the pilot signal with regards to the different precoders and thus determines for which precoder an acceptable quality of the received pilot signal is achieved/provided. The acceptable quality is in one example the best signal quality achieved. Thus, different precoders used on the received pilot signal result in different channel qualities. Hence, the UE shall select or determine one precoder, for each individual Rank, which provides an acceptable channel quality. It shall be pointed out that no precoder may provide a relatively good channel quality, for some reasons, and then the UE may select the precoder that provides the best channel quality.

Once the UE has determined, for each individual Rank, a respective precoder, the UE transmits, to the Network Node, a PMI indicating the determined precoder.

The method performed by the UE has several advantages. The UE will not need to evaluate and analyse 16 different precoders for each individual Rank, but instead a few number of precoders need to be evaluated by the UE. Hence, the UE may save power consumption due to less processing needed which may result in battery life improvement. Further, the percentage degradation with respect to a full evaluation of all 16 precoders for each individual Rank is minimal and the complexity, at the UE, may be reduced up to 8 times.

Embodiments herein also relate to a Network Node operable in a Multiple Input Multiple Output, MIMO, radio communication system adapted for determining a precoder of a Codebook to use for transmissions to a UE, the Network Node comprising at least two transmitting antennas corresponding to two individual Ranks. The Network Node has the same advantages, technical features and objects as the method performed by the Network Node. The Network Node will only be described in brief in order to avoid unnecessary repetition.

Such a Network Node will now be described with reference to FIG. 3.

Figure 3:
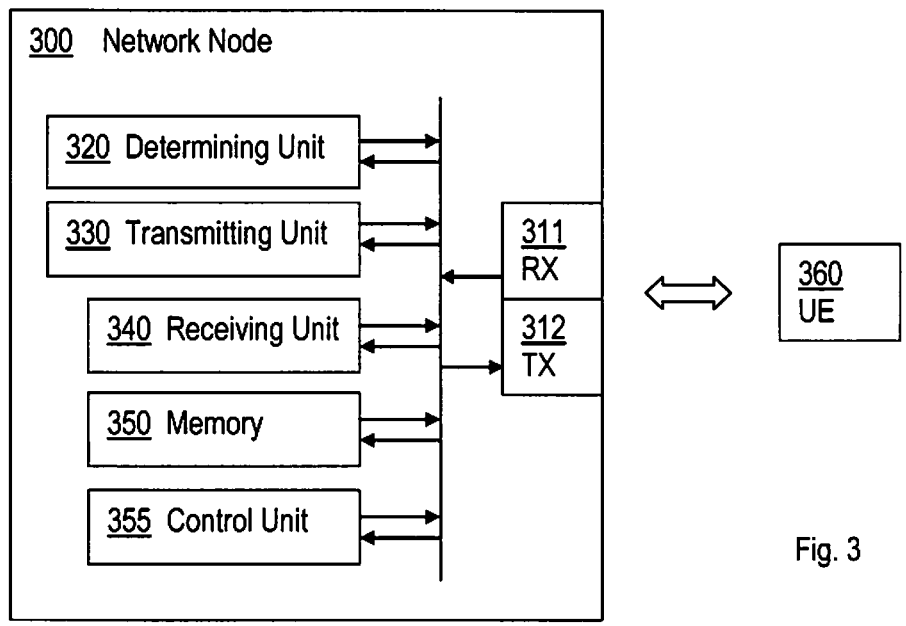
FIG. 3 is a block diagram of a Network Node operable in a MIMO radio communication system adapted for determining a precoder of a codebook to use for transmissions to a UE according to an exemplifying embodiment.

FIG. 3 illustrates the Network Node 300 comprising a determining unit 320 adapted to determine, for individual Ranks, which precoders out of 16 predefined precoders that the UE 360 shall evaluate, wherein the number of precoders to evaluate are less than 16. The Network Node 300 further comprises a transmitting unit 330 adapted to transmit, to the UE 360, the determined precoders the UE 360 shall evaluate for the individual Ranks. The Network Node 300 also comprises a receiving unit 340 adapted to receive, from the UE 360, a PMI associated with one of the determined precoders, which the UE 360 requests the Network Node 300 to use for transmission to the UE 360 for the individual Ranks. The transmitting unit 330 is further adapted to transmit, to the UE 360, data using the requested precoders for the individual Ranks.

The Network Node has the same advantages as the method performed by the Network Node. The UE will not need to evaluate and analyse 16 different precoders for each individual Rank, but instead a few number of precoders need to be evaluated by the UE. Hence, the UE may save power consumption due to less processing needed which may result in battery life improvement. Further, the percentage degradation with respect to a full evaluation of all 16 precoders for each individual Rank is minimal and the complexity, at the UE, may be reduced up to 8 times.

According to an embodiment, at least one Rank is associated with a different number of precoders compared to the other Ranks.

According to still an embodiment, the transmitting unit 330 is adapted to transmit the determined precoders to the UE 360 to evaluate for the individual Ranks by transmitting a bitmap wherein each position in the bitmap correspond to a precoder in the Codebook.

According to yet an embodiment, the MIMO radio communication system is based on Long Term Evolution, LTE, High Speed Packet Access, HSPA or WiMax.

Embodiments herein also relate to a UE operable in a Multiple Input Multiple Output, MIMO, radio communication system adapted for determining a PMI to report to a Network Node, the UE comprising at least two receiving antennas corresponding to two Ranks. The UE has the same advantages, technical features and objects as the method performed by the UE. The UE will only be described in brief in order to avoid unnecessary repetition.

Such a UE will now be described with reference to FIG. 4.

Figure 4:
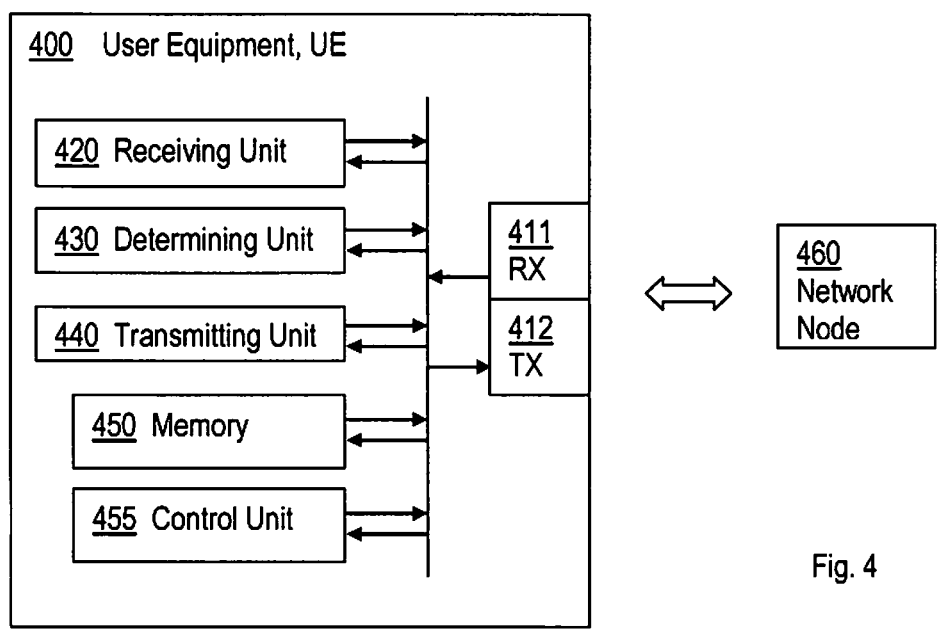
FIG. 4 is a block diagram of a UE operable in a MIMO radio communication system adapted for determining a PMI to report to a Network Node according to an exemplifying embodiment.

FIG. 4 illustrates the UE 400 comprising a receiving unit 420, adapted to receive, from the Network Node 460, information regarding, for individual Ranks, which precoders out of 16 predefined precoders the UE 400 shall evaluate, wherein the number of precoders to evaluate are less than 16. The UE 400 further comprises a determining unit 430, adapted to determine, for each of the precoders to be evaluated, a channel quality of a pilot signal received from the Network Node 460; and to determine for which precoder an acceptable quality of the received pilot signal is achieved/provided. The UE 400 also comprises a transmitting unit 440, adapted to transmit, to the Network Node, a Precoding Matrix Indicator, PMI, indicating the determined precoder.

The UE has the same advantages as the method performed by the UE. The UE will not need to evaluate and analyse 16 different precoders for each individual Rank, but instead a few number of precoders need to be evaluated by the UE. Hence, the UE may save power consumption due to less processing needed which may result in battery life improvement. Further, the percentage degradation with respect to a full evaluation of all 16 precoders for each individual Rank is minimal and the complexity, at the UE, may be reduced up to 8 times.

By the method performed by the Network Node and the UE and the Network Node and the UE described above, the Network Node is enabled to control the complexity of the evaluation performed by the UE for determining a respective precoder of the codebook for each of the individual Ranks to be used for transmissions from the Network Node to the UE. The UE does not need to perform a complete evaluation, or search, of the entire codebook for all possible precoders in the codebook. This may improve battery life of the UE. Simulations have been performed which shows that the performance does not degrade severely and the complexity at the UE may be reduced up to a factor 8.

Figure 5:
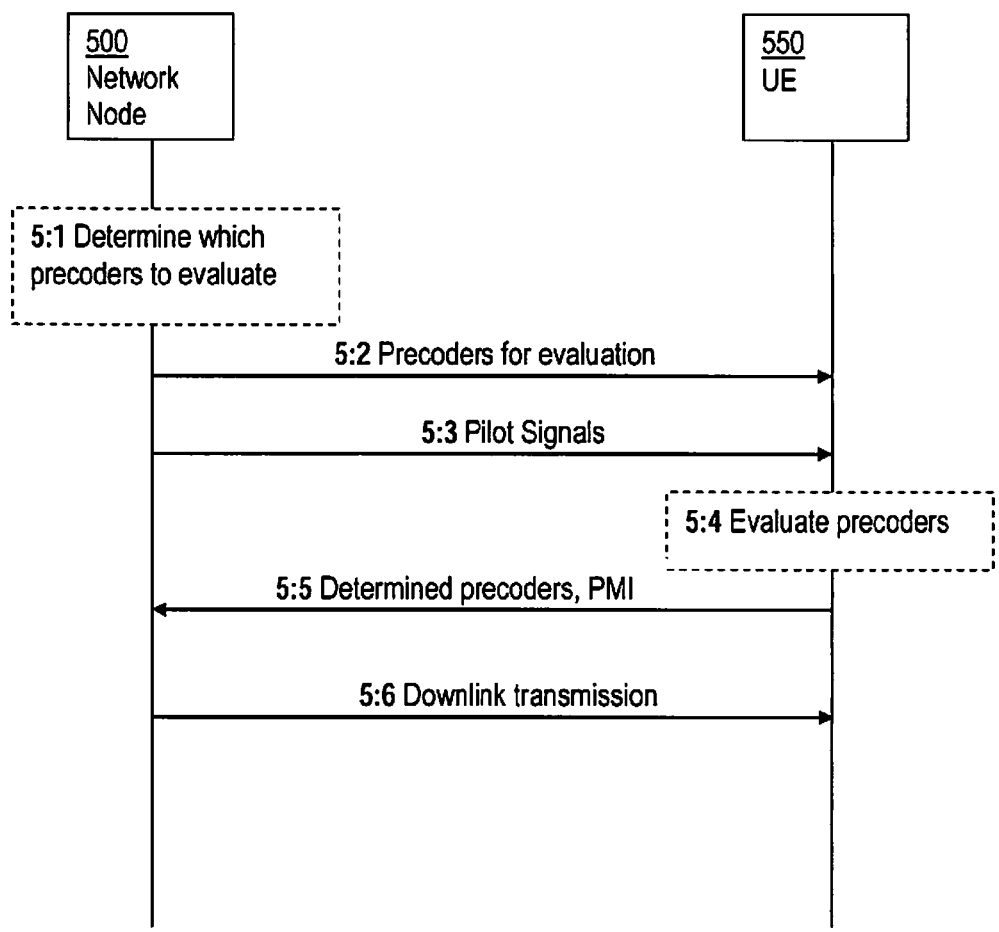
FIG. 5 is a schematic message sequence signalling diagram between a Network Node and a UE.

FIG. 5 is a schematic message sequence signalling diagram between a Network Node and a UE. FIG. 5 illustrates the Network Node 500 determining 5:1 which precoders to evaluate. This corresponds to the action 110 of FIG. 1, namely to determine, for individual Ranks, which precoders out of 16 predefined precoders that the UE shall evaluate, wherein the number of precoders to evaluate are less than 16. Once the Network Node has determined which precoders to evaluate, the Network Node informs the UE which precoders to evaluate, this is illustrated in FIG. 5 by the Network Node 500 sending 5:2 Precoders for evaluation to the UE 550. This corresponds to action 120 of FIG. 1 and action 210 of FIG. 2. The Network Node also broadcasts pilot signals which are used by the UE 550 in order to perform different measurements e.g. with regard to signal quality.

The UE 550 evaluates 5:4 the different precoders which corresponds to actions 220 and 230 of FIG. 2. In other words, the UE 550 determines, for each of the precoders to be evaluated, a channel quality of a pilot signal received from the Network Node; and for which precoder an acceptable quality of the received pilot signal is achieved/provided. Once the UE 550 has evaluated in action 5:4 of FIG. 5, the different precoders and has determined a precoders for each individual Rank for which an acceptable quality of the received pilot signal is achieved/provided, i.e. has determined a precoders for each individual Rank which the UE 550 wishes the Network Node 500 to use for downlink transmissions to the UE 550, the UE transmits 5:5 Determined precoders, PMI to the Network Node 500. This corresponds to action 240 of FIG. 2, wherein the UE transmits, to the Network Node, a Precoding Matrix Indicator, PMI, indicating the determined precoder, i.e. one PMI per individual Rank. This action also corresponds to action 130 of FIG. 1, wherein the network Node 500 receives the PMI associated with one of the determined precoders, which the UE requests the Network Node to use for transmission to the UE for the individual Ranks, i.e. one PMI per individual Rank.

The Network Node 500 then uses indicating the determined precoder for downlink transmissions to the UE 550, illustrated in FIG. 5 by the Network Node 500 sending 5:6 Downlink transmission to the UE 550. Action 5:6 of FIG. 5 corresponds to action 140 of FIG. 1.

Figure 6:
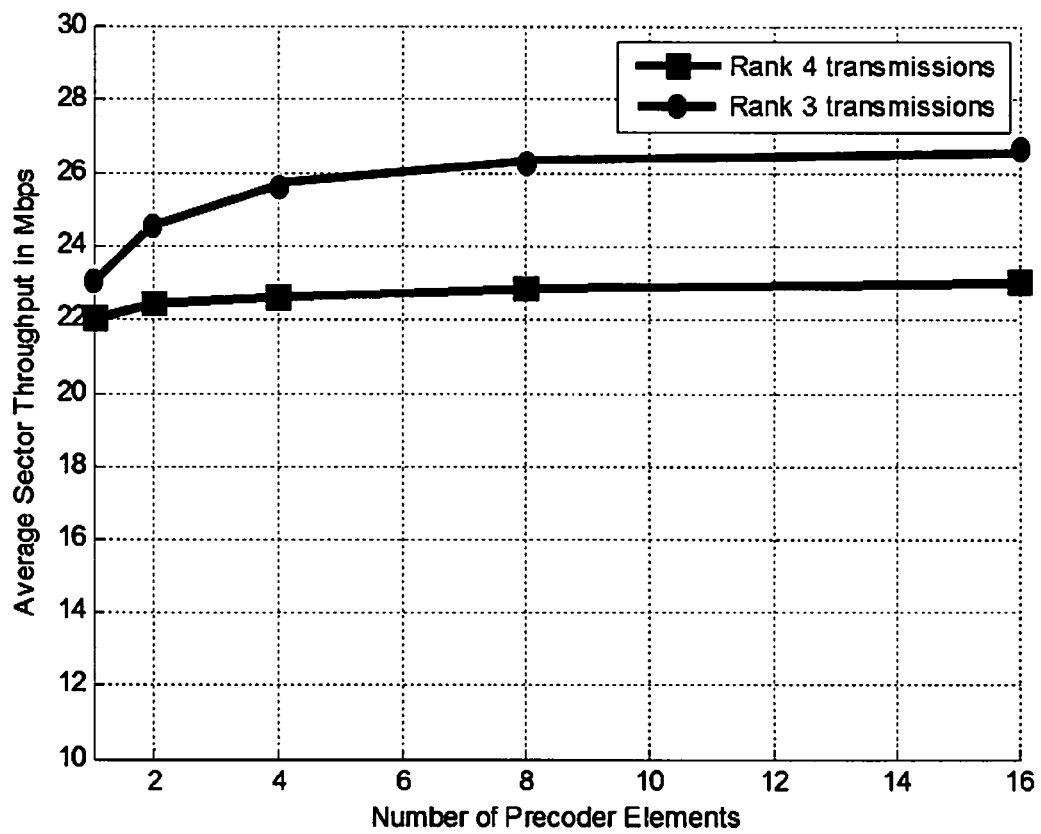
FIG. 6 illustrates system level simulation results for Rank 3 and Rank 4 only transmissions.

FIG. 6 illustrates system level simulation results for Rank 3 and Rank 4 only transmissions. FIG. 6 shows the average sector throughput for various number of precoder elements for Rank 4 and Rank 3 only transmissions. Note that precoder elements are fixed in the codebook. It can be observed that as the number of elements is decreased, the performance is degraded. It can be observed that nearly no loss occurs if the number of precoder elements is reduced to 4.

Figure 7:
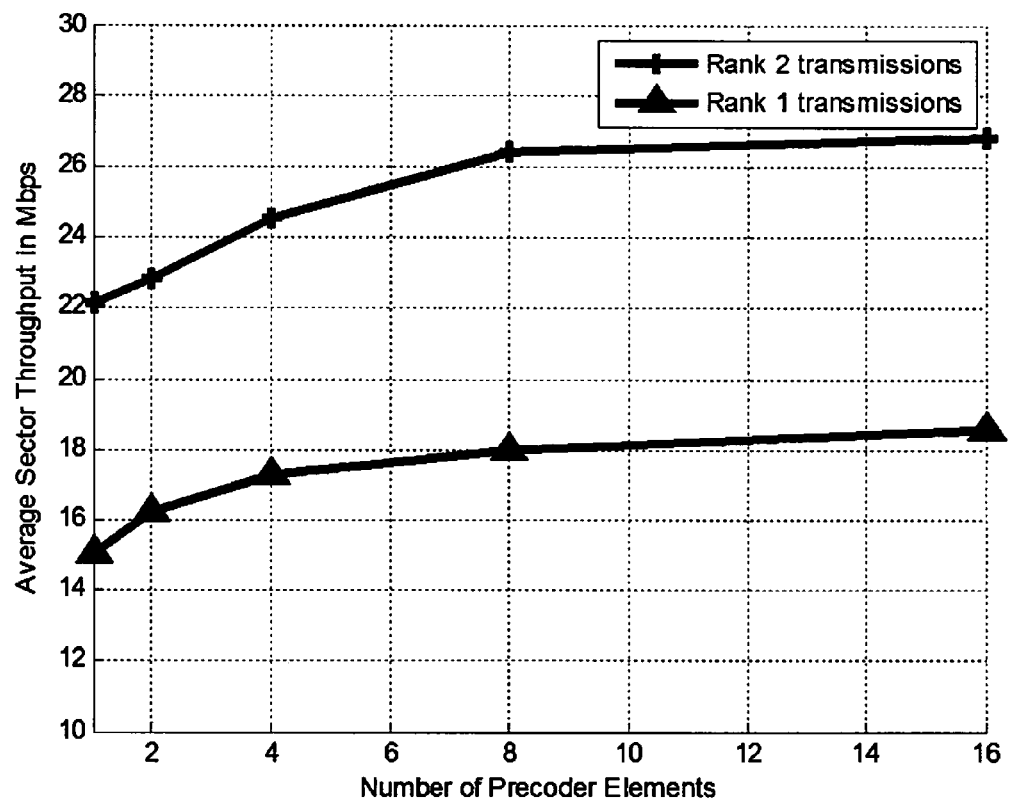
FIG. 7 illustrates system level simulation results for Rank 1 and Rank 2 only transmissions.

FIG. 7 illustrates system level simulation results for Rank 1 and Rank 2 only transmissions. FIG. 7 shows the average sector throughput for various numbers of precoder elements for Rank 1 and Rank 2 only transmissions. Also in this case, precoder elements are fixed and the performance is degraded as the number of elements is decreased. In this case the rate degradation is relatively high.

Figure 8:
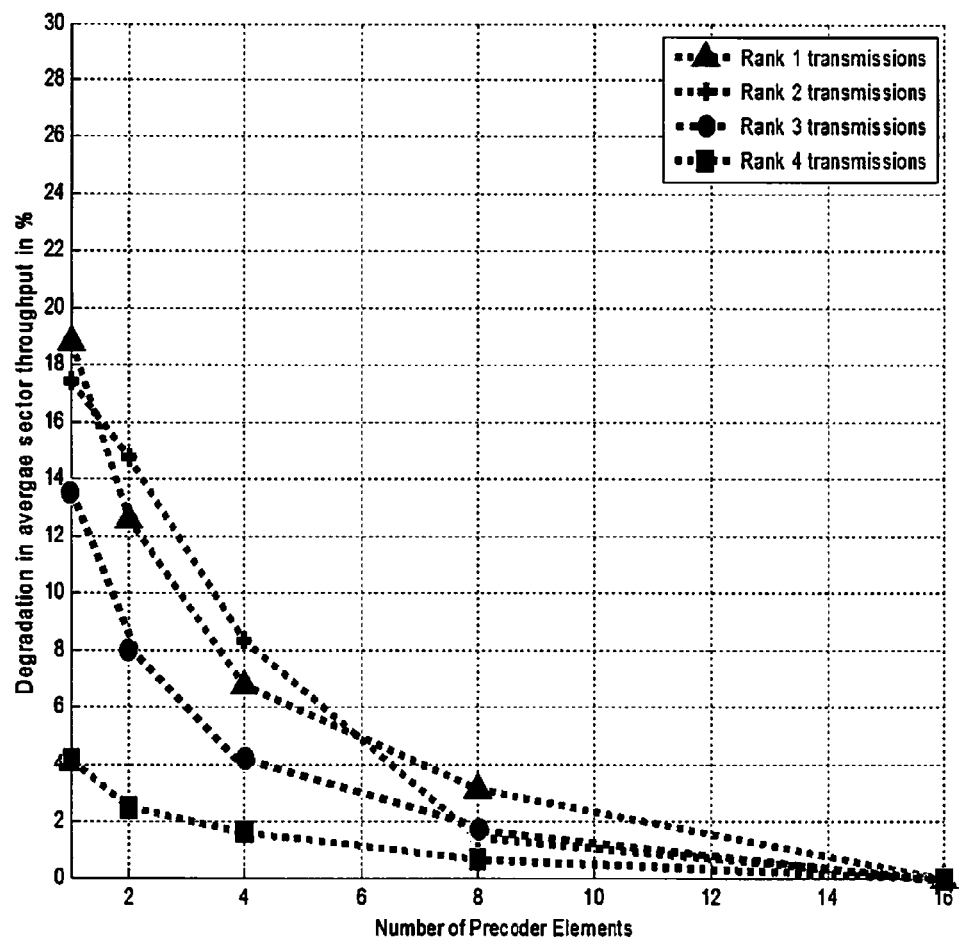
FIG. 8 illustrates percentage degradation with reduced number of precoder elements.
Figure 9:
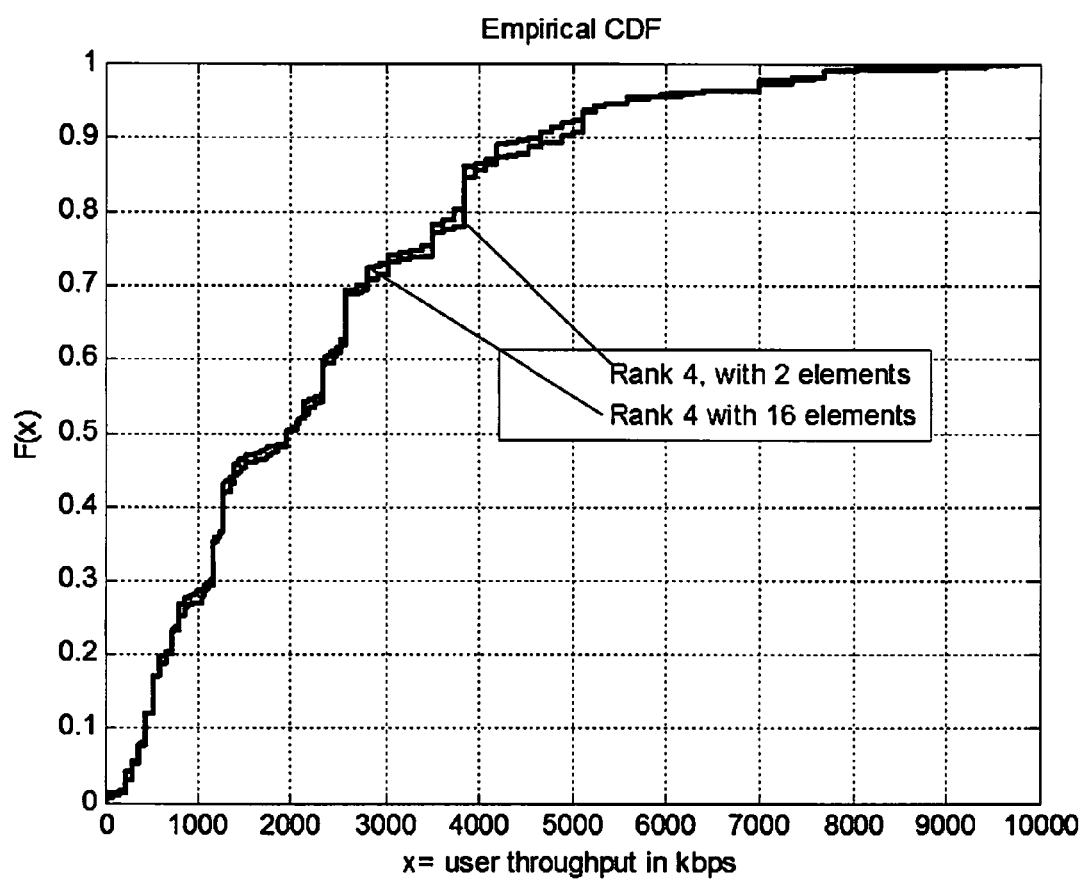
FIG. 9 illustrates user throughput for Rank 4 transmissions.
Figure 10:
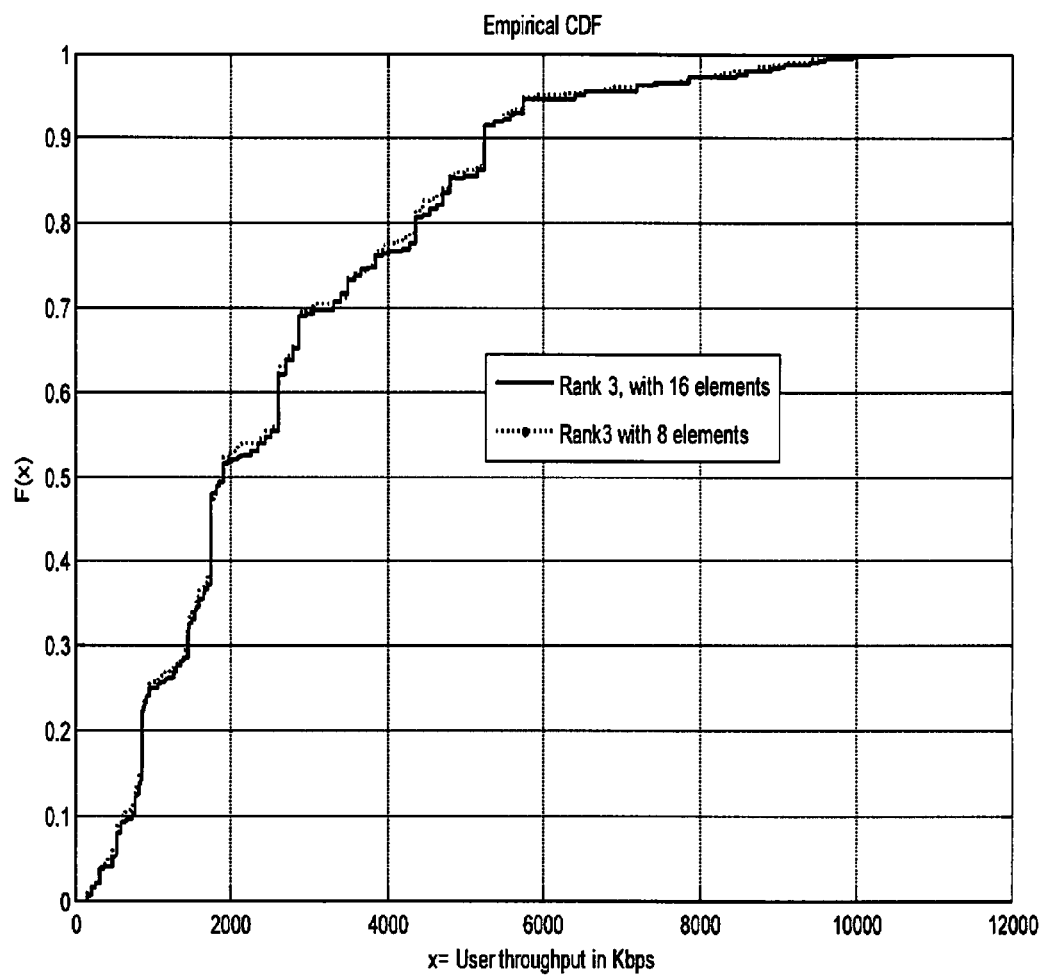
FIG. 10 illustrates user throughput for Rank 3 transmissions.
Figure 11:
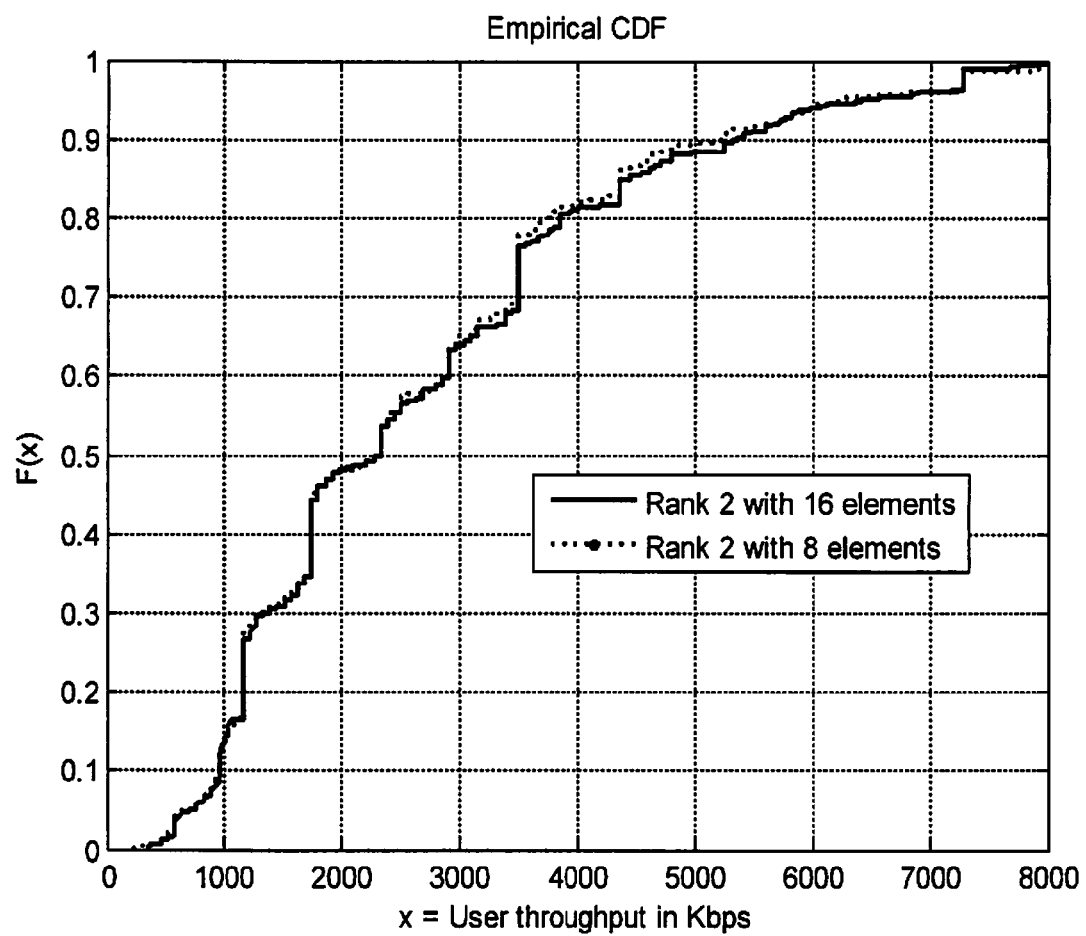
FIG. 11 illustrates user throughput for Rank 2 transmissions.
Figure 12:
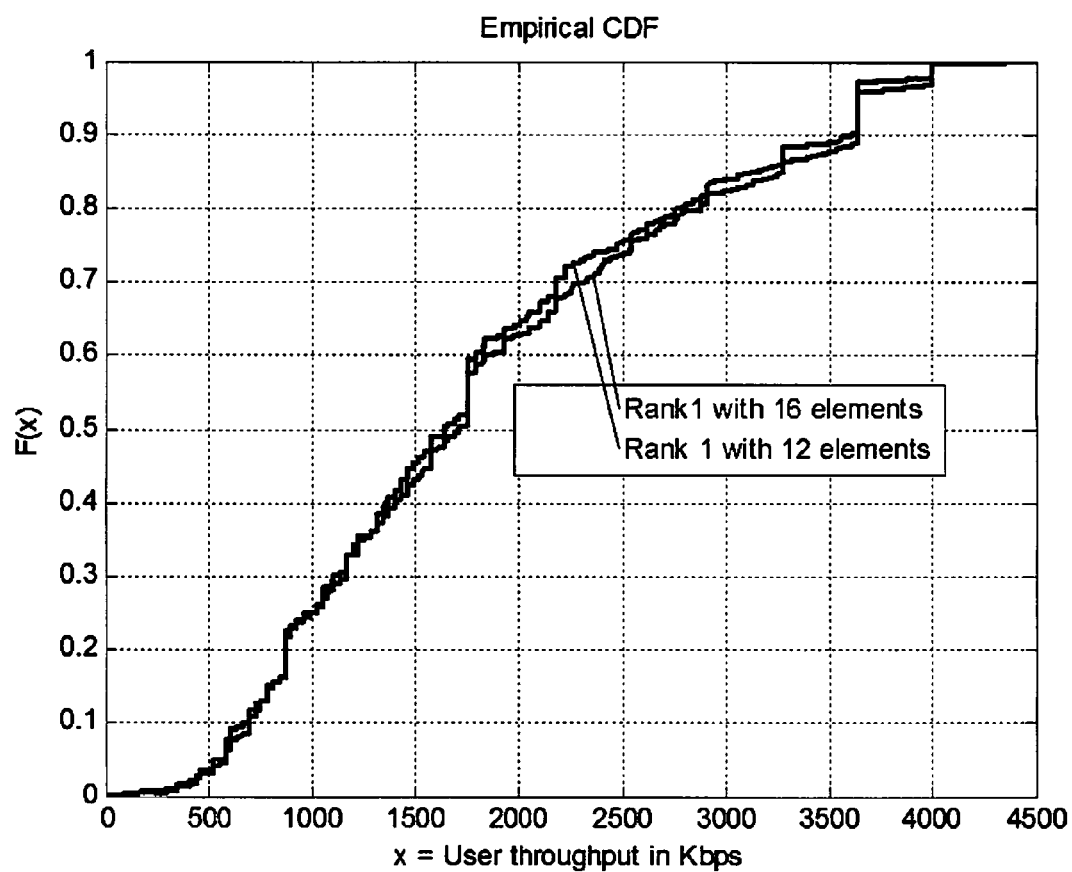
FIG. 12 illustrates user throughput for Rank 1 transmissions.

FIG. 8 illustrates percentage degradation with reduced number of precoder elements. If the loss should be less than 2%, then the number of precoder elements for Rank 4 transmission is 2, for Rank 3 transmissions is 8, for Rank 2 transmissions is 8, and for Rank 1 transmissions it is 12. Hence the complexity for Rank 4 transmissions can be reduced by 8 times if a loss of 2% can be tolerated.

FIGS. 9-12 show user throughput for Rank 4, Rank 3, Rank 2 and Rank 1 transmissions respectively. Note that the number of elements for Rank 4, Rank 3, Rank 2 and Rank 1 are chosen to 2, 8, 8, and 12. It can be observed that user throughputs are overlapping.

Figure 13:
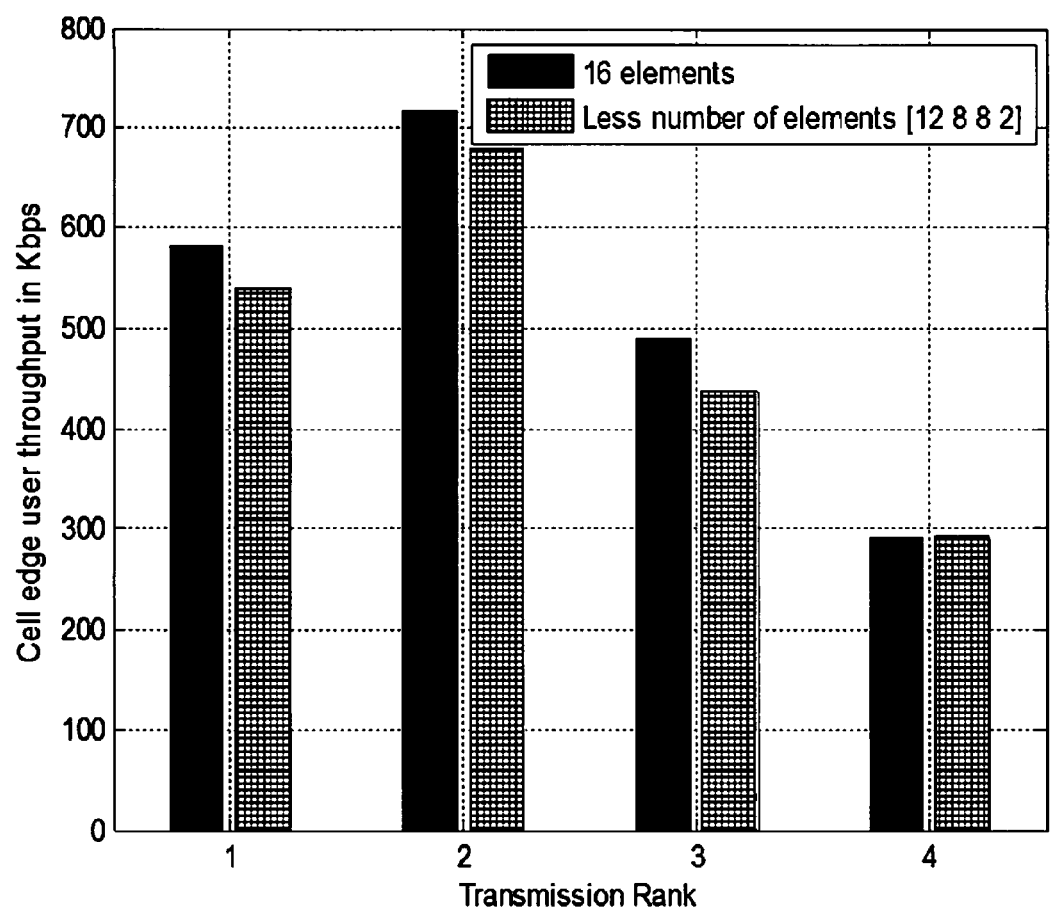
FIG. 13 is a diagram of cell-edge user throughput for all Rank transmissions.

FIG. 13 is a diagram of cell-edge user throughput for all Rank transmissions. It can be observed that the performance loss is negligible.

It can be seen from the above simulations results, with reduced codebook, it is possible to reduce the computational complexity for finding Rank Information, RI/PCI without compromising on the performance. Hence the Network Node can reduce the complexity at the UE in computing the RI/PMI.

In FIG. 3, the Network Node 300 is also illustrated comprising a receiving unit 311 and a transmitting unit 312. Through these two units, the Network Node 300 is adapted to communicate with other nodes and/or entities in the wireless communication network. The receiving unit 311 may comprise more than one receiving arrangement. For example, the receiving unit may be connected to both a wire and an antenna, by means of which the Network Node 300 is enabled to communicate with other nodes and/or entities in the wireless communication network. Similarly, the transmitting unit 312 may comprise more than one transmitting arrangement, which in turn is/are connected to both a wire and an antenna, by means of which the Network Node 300 is enabled to communicate with other nodes and/or entities in the wireless communication network. The Network Node 300 further comprises a memory 350 for storing data. Further, the Network Node 300 is illustrated comprising a control or processing unit 355 which in turns is connected to the different units 320-350. It shall be pointed out that this is merely an illustrative example and the Network Node 300 may comprise more, less or other units or modules which execute the functions of the Network Node 300 in the same manner as the units illustrated in FIG. 3.

It should be noted that FIG. 3 merely illustrates various functional units in the Network Node 300 in a logical sense. The functions in practice may be implemented using any suitable software and hardware means/circuits etc. Thus, the embodiments are generally not limited to the shown structures of the Network Node 300 and the functional units. Hence, the previously described exemplary embodiments may be realised in many ways. For example, one embodiment includes a computer-readable medium having instructions stored thereon that are executable by the control or processing unit 355 for executing the method steps in the Network Node 300. The instructions executable by the computing system and stored on the computer-readable medium perform the method steps of the Network Node 300 as set forth in the claims.

In FIG. 4, the UE 400 is also illustrated comprising a receiving unit 411 and a transmitting unit 412. Through these two units, the UE 400 is adapted to communicate with other nodes and/or entities in the wireless communication network. The receiving unit 411 may comprise more than one receiving arrangement. For example, the receiving unit may be connected to both a wire and an antenna, by means of which the UE 400 is enabled to communicate with other nodes and/or entities in the wireless communication network. Similarly, the transmitting unit 412 may comprise more than one transmitting arrangement, which in turn are connected to both a wire and an antenna, by means of which the UE 400 is enabled to communicate with other nodes and/or entities in the wireless communication network. The UE 400 further comprises a memory 450 for storing data. Further, the UE 400 is illustrated comprising a control or processing unit 455 which in turns is connected to the different units 420-450. It shall be pointed out that this is merely an illustrative example and the UE 400 may comprise more, less or other units or modules which execute the functions of the UE 400 in the same manner as the units illustrated in FIG. 4.

It should be noted that FIG. 4 merely illustrates various functional units in the UE 400 in a logical sense. The functions in practice may be implemented using any suitable software and hardware means/circuits etc. Thus, the embodiments are generally not limited to the shown structures of the UE 400 and the functional units. Hence, the previously described exemplary embodiments may be realised in many ways. For example, one embodiment includes a computer-readable medium having instructions stored thereon that are executable by the control or processing unit 455 for executing the method steps in the UE 400. The instructions executable by the computing system and stored on the computer-readable medium perform the method steps of the UE 400 as set forth in the claims.

Figure 15:
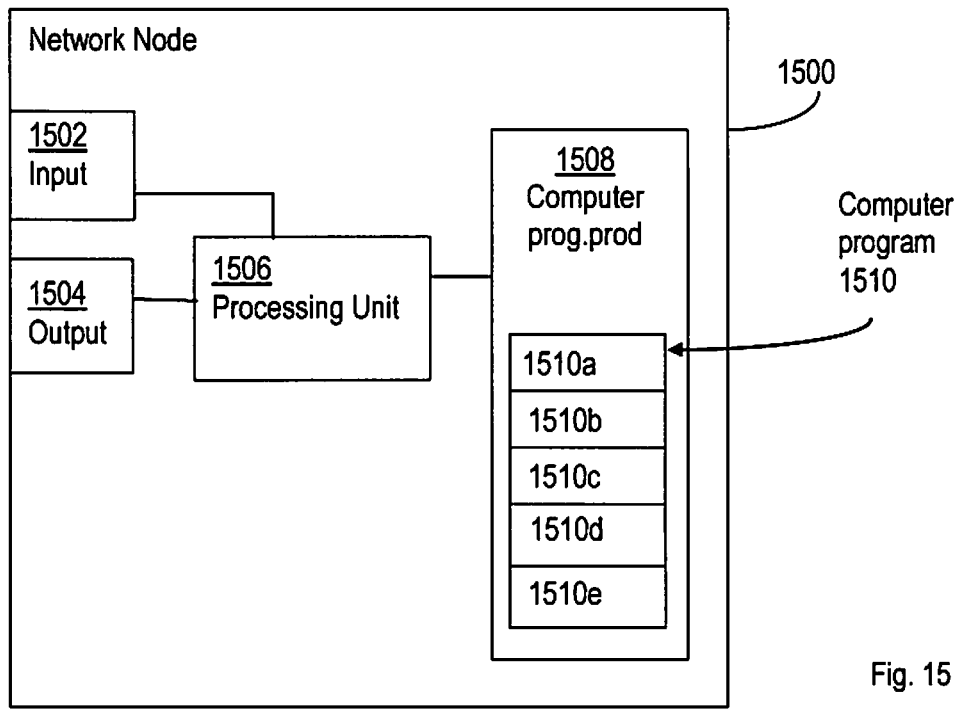
FIG. 15 is a schematic view illustrating a Network Node according to an exemplifying embodiment.

FIG. 15 schematically shows an embodiment of a Network Node 1500. Comprised in the Network Node 1500 are here a processing unit 1506, e.g. with a DSP (Digital Signal Processor). The processing unit 1506 may be a single unit or a plurality of units to perform different actions of procedures described herein. The Network Node 1500 may also comprise an input unit 1502 for receiving signals from other entities, and an output unit 1504 for providing signal(s) to other entities. The input unit and the output unit may be arranged as an integrated entity or as illustrated in the example of FIG. 3, as one or more interfaces 311/312.

Furthermore, the Network Node 1500 comprises at least one computer program product 1508 in the form of a non-volatile memory, e.g. an EEPROM (Electrically Erasable Programmable Read-Only Memory), a flash memory and a hard drive. The computer program product 1508 comprises a computer program 1510, which comprises code means, which when executed in the processing unit 1506 in the Network Node 1500 causes the Network Node 1500 to perform the actions e.g. of the procedure described earlier in conjunction with FIG. 1.

The computer program 1510 may be configured as a computer program code structured in computer program modules 1510*a*-1510*e*. Hence, in an exemplifying embodiment, the code means in the computer program of the Network Node 1500 comprises a determining unit, or module, for determining, for individual Ranks, which precoders out of 16 predefined precoders that the UE shall evaluate, wherein the number of precoders to evaluate are less than 16. The computer program further comprises a transmitting unit, or module, for transmitting, to the UE, the determined precoders the UE shall evaluate for the individual Ranks. The computer program further comprises a receiving unit, or module, for receiving, from the UE, a PMI associated with one of the determined precoders, which the UE requests the Network Node to use for transmission to the UE for the individual Ranks, wherein the a transmitting unit, or module, transmits, to the UE, data using the requested precoders for the individual Ranks.

The computer program modules could essentially perform the actions of the flow illustrated in FIG. 1, to emulate the Network Node 1500. In other words, when the different computer program modules are executed in the processing unit 1506, they may correspond to the units 320-350 of FIG. 3.

Figure 16:
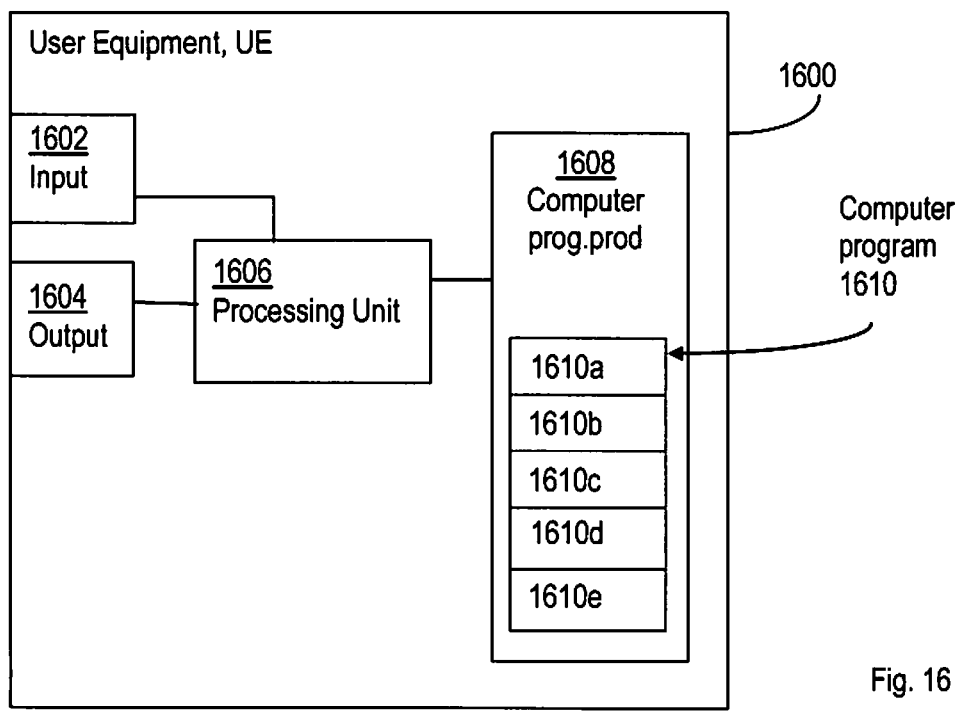
FIG. 16 is a schematic view illustrating a UE according to an exemplifying embodiment.

FIG. 16 schematically shows an embodiment of a UE 1600. Comprised in the UE 1600 are here a processing unit 1606, e.g. with a DSP (Digital Signal Processor). The processing unit 1606 may be a single unit or a plurality of units to perform different actions of procedures described herein. The UE 1600 may also comprise an input unit 1602 for receiving signals from other entities, and an output unit 1604 for providing signal(s) to other entities. The input unit and the output unit may be arranged as an integrated entity or as illustrated in the example of FIG. 4, as one or more interfaces 411/412.

Furthermore, the UE 1600 comprises at least one computer program product 1608 in the form of a non-volatile memory, e.g. an EEPROM (Electrically Erasable Programmable Read-Only Memory), a flash memory and a hard drive. The computer program product 1608 comprises a computer program 1610, which comprises code means, which when executed in the processing unit 1606 in the UE 1600 causes the UE 1600 to perform the actions e.g. of the procedure described earlier in conjunction with FIG. 2.

The computer program 1610 may be configured as a computer program code structured in computer program modules 1610*a*-1610*e*. Hence, in an exemplifying embodiment, the code means in the computer program of the UE 1600 comprises a receiving unit, or module, for receiving, from the Network Node, information regarding, for individual Ranks, which precoders out of 16 predefined precoders the UE 1600 shall evaluate, wherein the number of precoders to evaluate is less than 16. The computer program further comprises a determining unit, or module, for determining, for each of the precoders to be evaluated, a channel quality of a pilot signal received from the Network Node; and for determining for which precoder an acceptable quality of the received pilot signal is achieved/provided. The computer program further comprises a transmitting unit, or module, for transmitting, to the Network Node, a PMI indicating the determined precoder.

The computer program modules could essentially perform the actions of the flow illustrated in FIG. 2, to emulate the UE 1600. In other words, when the different computer program modules are executed in the processing unit 1606, they may correspond to the units 420-450 of FIG. 4.

Although the code means in the respective embodiments disclosed above in conjunction with FIGS. 3 and 4 are implemented as computer program modules which when executed in the respective processing unit causes the Network Node and the UE respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the Network Node and the UE respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a Network Node operable in a Multiple Input Multiple Output, MIMO, radio communication system for determining a precoder of a Codebook to use for transmissions in a cell to a User Equipment, UE, the Network Node comprising at least two transmitting antennas corresponding to at least two individual Ranks, the method comprising:
   determining, based on an expected loss being less than an acceptable loss, a maximum number of precoders for individual ranks that the UE shall evaluate, wherein the expected loss is a loss in cell edge user throughput, in the cell that the Network Node transmits to the UE, that is expected for the determined maximum number of precoders for the individual ranks, and wherein the acceptable loss is a level of loss in cell edge user throughput, in the cell, that is predetermined to be acceptable;
   determining, for the individual Ranks, which precoders, out of a plural total number of predefined precoders per individual rank in the codebook, that the UE shall evaluate, wherein the number of precoders to evaluate for each individual rank is constrained to not be greater than the determined maximum number of precoders and wherein the determined maximum number of precoders is less than the plural total number of the predefined precoders per individual rank in the codebook;
   transmitting, to the UE, the determined precoders the UE shall evaluate for the individual Ranks;
   receiving, from the UE, a Precoding Matrix Indicator, PMI, associated with one of the determined precoders, which the UE requests the Network Node to use for transmission to the UE for the individual Ranks; and
   transmitting, to the UE, data using the requested precoders for the individual Ranks.

2. The method of claim 1, wherein the number of precoders to evaluate for at least one Rank is different from the number of precoders to evaluate for another at least one Rank.

3. The method of claim 1, wherein transmitting the determined precoders to the UE to evaluate for the individual Ranks comprises transmitting a bitmap wherein each position in the bitmap correspond to a precoder in the Codebook.

4. The method of claim 1, wherein the MIMO radio communication system is based on Long Term Evolution, LTE, High Speed Packet Access, HSPA or WiMax.

5. A computer program product comprising a non-transitory computer readable medium storing code, which when run in a processor comprised in a Network Node causes the Network Node to perform the method of claim 1.

6. The method of claim 1, wherein the determined maximum number of precoders for at least one Rank is different from the determined maximum number of precoders for another at least one Rank, based on an expected loss for transmissions within the at least one Rank being different than an expected loss for transmissions within the another at least one Rank at a maximum number of precoders that is at least one of the determined maximum number of precoders for the at least one Rank and/or the determined maximum number of precoders for the another at least one Rank.

7. A method performed by a User Equipment, UE, operable in a Multiple Input Multiple Output, MIMO, radio communication system for determining a Precoding Matrix Indicator, PMI, to report to a Network Node, the UE comprising at least two receiving antennas corresponding to at least two Ranks, the method comprising:
   receiving, from the Network Node, information regarding, for individual Ranks, which precoders, out of a plural total number of predefined precoders per individual rank in a codebook, that the UE shall evaluate, wherein the number of precoders to evaluate for each individual rank is constrained to be not greater than a determined maximum number of precoders, wherein the determined maximum number of precoders is less than the plural total number of the predefined precoders per individual rank in the codebook, wherein the determined maximum number of precoders is determined based on an expected loss being less than an acceptable loss, wherein the expected loss is a loss in cell edge user throughput, in a cell that the Network Node transmits to the UE, that is expected for the determined maximum number of precoders for the individual ranks, and wherein the acceptable loss is a level of loss in cell edge user throughput, in the cell, that is predetermined to be acceptable;
   determining, for each of the precoders to be evaluated, a channel quality of a pilot signal received from the Network Node;
   determining for which precoder an acceptable quality of the received pilot signal is achieved/provided; and
   transmitting, to the Network Node, a Precoding Matrix Indicator, PMI, indicating the determined precoder.

8. A computer program product, comprising a non-transitory computer readable medium storing code, which when run in a processor comprised in a User Equipment, UE, causes the UE to perform the method of claim 7.

9. The method of claim 7, wherein the determined maximum number of precoders for at least one Rank is different from the determined maximum number of precoders for another at least one Rank, based on an expected loss for transmissions within the at least one Rank being different than an expected loss for transmissions within the another at least one Rank at a maximum number of precoders that is at least one of the determined maximum number of precoders for the at least one Rank and/or the determined maximum number of precoders for the another at least one Rank.

10. A Network Node operable in a Multiple Input Multiple Output, MIMO, radio communication system configured to determine a precoder of a Codebook to use for transmissions in a cell to a User Equipment, UE, the Network Node comprising:
   at least two transmitting antennas corresponding to at least two individual Ranks;
   a processor; and
   a non-volatile memory coupled to the processor and comprising computer readable program code that when executed by the processor causes the processor to perform operations comprising,
      determining, based on an expected loss being less than an acceptable loss, a maximum number of precoders for individual ranks that the UE shall evaluate, wherein the expected loss is a loss in cell edge user throughput, in the cell that the Network Node transmits to the UE, that is expected for the determined maximum number of precoders for the individual ranks, and wherein the acceptable loss is a level of loss in cell edge user throughput, in the cell, that is predetermined to be acceptable,
      determining, for the individual Ranks, which precoders out of a plural total number of predefined precoders per individual rank in the codebook, that the UE shall evaluate, wherein the number of precoders to evaluate for each individual rank is constrained to not be greater than the determined maximum number of precoders and wherein the determined maximum number of precoders is less than the plural total number of the predefined precoders per individual rank in the codebook,
      transmitting, to the UE, the determined precoders the UE shall evaluate for the individual Ranks,
      receiving, from the UE, a Precoding Matrix Indicator, PMI, associated with one of the determined precoders, which the UE requests the Network Node to use for transmission to the UE for the individual Ranks, and
      transmitting, to the UE, data using the requested precoders for the individual Ranks.

11. The Network Node of claim 10, wherein the number of precoders to evaluate for at least one Rank is different from the number of precoders-to evaluate for another at least one Rank.

12. The Network Node of claim 10, wherein the transmitting the determined precoders to the UE to evaluate for the individual Ranks comprises transmitting a bitmap wherein each position in the bitmap correspond to a precoder in the Codebook.

13. The Network Node of claim 10, wherein the MIMO radio communication system is based on Long Term Evolution, LTE, High Speed Packet Access, HSPA or WiMax.

14. The Network Node of claim 10, wherein the determined maximum number of precoders for at least one Rank is different from the determined maximum number of precoders for another at least one Rank, based on an expected loss for transmissions within the at least one Rank being different than an expected loss for transmissions within the another at least one Rank at a maximum number of precoders that is at least one of the determined maximum number of precoders for the at least one Rank and/or the determined maximum number of precoders for the another at least one Rank.

15. A User Equipment, UE, operable in a Multiple Input Multiple Output, MIMO, radio communication system, the UE comprising:
   at least two receiving antennas corresponding to at least two Ranks;
   a processor; and
   a non-volatile memory coupled to the processor and comprising computer readable program code that when executed by the processor causes the processor to perform operations comprising,
      receiving, from a Network Node, information regarding, for individual Ranks, which precoders out of a plural total number of predefined precoders per individual rank in a codebook, that the UE shall evaluate, wherein the number of precoders to evaluate for each individual rank is constrained to be not greater than a determined maximum number of precoders, wherein the determined maximum number of precoders is less than the plural total number of the predefined precoders per individual rank in the codebook, wherein the determined maximum number of precoders is determined based on an expected loss being less than an acceptable loss, wherein the expected loss is a loss in cell edge user throughput, in a cell that the Network Node transmits to the UE, that is expected for the determined maximum number of precoders for the individual ranks, and wherein the acceptable loss is a level of loss in cell edge user throughput, in the cell, that is predetermined to be acceptable,
      determining, for each of the precoders to be evaluated, a channel quality of a pilot signal received from the Network Node; and to determine for which precoder an acceptable quality of the received pilot signal is achieved/provided, and
      transmitting, to the Network Node, a Precoding Matrix Indicator, PMI, indicating the determined precoder.

16. The User Equipment of claim 15, wherein the determined maximum number of precoders for at least one Rank is different from the determined maximum number of precoders for another at least one Rank, based on an expected loss for transmissions within the at least one Rank being different than an expected loss for transmissions within the another at least one Rank at a maximum number of precoders that is at least one of the determined maximum number of precoders for the at least one Rank and/or the determined maximum number of precoders for the another at least one Rank.

* * * * *